(12) United States Patent
Kamada et al.

(10) Patent No.: US 10,345,647 B2
(45) Date of Patent: Jul. 9, 2019

(54) SURFACE LIGHT SOURCE DEVICE AND TRANSMISSION DISPLAY DEVICE

(71) Applicant: NICHIA CORPORATION, Anan-shi (JP)

(72) Inventors: Kazuhiro Kamada, Tokushima (JP); Yusaku Achi, Tokushima (JP); Tomohisa Kishimoto, Anan (JP); Satoshi Yoshinaga, Yoshinogawa (JP)

(73) Assignee: NICHIA CORPORATION, Anan-shi (JP)

( * ) Notice: Subject to any disclaimer, the term of this patent is extended or adjusted under 35 U.S.C. 154(b) by 120 days.

(21) Appl. No.: 15/220,397

(22) Filed: Jul. 27, 2016

(65) Prior Publication Data

US 2017/0030549 A1  Feb. 2, 2017

(30) Foreign Application Priority Data

Jul. 30, 2015  (JP) ................................. 2015-150631
Jul. 12, 2016  (JP) ................................. 2016-137577

(51) Int. Cl.
| | |
|---|---|
| G02F 1/1335 | (2006.01) |
| G02B 3/00 | (2006.01) |
| G02B 5/04 | (2006.01) |
| F21V 7/00 | (2006.01) |

(52) U.S. Cl.
CPC ...... *G02F 1/133611* (2013.01); *F21V 7/0083* (2013.01); *G02B 3/0062* (2013.01); *G02B 5/045* (2013.01); *G02F 1/133606* (2013.01); *G02F 2001/133607* (2013.01)

(58) Field of Classification Search
CPC ......... G02F 1/133603; G02F 1/133606; G02F 2001/133607; G02F 1/133611; F21V 7/0083; G02B 3/005; G02B 3/0056; G02B 3/0062
See application file for complete search history.

(56) References Cited

U.S. PATENT DOCUMENTS

| | | | |
|---|---|---|---|
| 2009/0091919 A1* | 4/2009 | Goto ................. | G02F 1/133603 362/97.1 |
| 2009/0201665 A1 | 8/2009 | Goto | |
| 2010/0039797 A1* | 2/2010 | Shinkai ............... | G02B 3/0006 362/97.1 |
| 2010/0188609 A1 | 7/2010 | Matsuki et al. | |

(Continued)

FOREIGN PATENT DOCUMENTS

| | | |
|---|---|---|
| EP | 1083756 | 3/2001 |
| JP | 07-218911 | 8/1995 |

(Continued)

*Primary Examiner* — Suezu Ellis
(74) *Attorney, Agent, or Firm* — Mori & Ward, LLP

(57) ABSTRACT

A base has a base surface. Light emitting elements are disposed on the base surface along an X-axis with an X pitch and along the Y axis with a Y pitch to form a matrix. The X pitch is smaller than the Y pitch. Lenses has a batwing illumination distribution. Each of the lenses covers each of the light emitting elements. A first lenticular lens sheet is provided on the base such that a first lenticular lens sheet lower surface is opposite to the base surface. A second lenticular lens sheet is provided on the first lenticular lens sheet such that a second lenticular lens sheet lower surface is opposite to a first lenticular lens sheet upper surface.

18 Claims, 8 Drawing Sheets

(56) References Cited

U.S. PATENT DOCUMENTS

| | | | |
|---|---|---|---|
| 2011/0205734 A1 | 8/2011 | Yamakita et al. | |
| 2011/0292639 A1* | 12/2011 | Ha | G02F 1/133603 362/97.1 |
| 2012/0020081 A1 | 1/2012 | Goto et al. | |
| 2012/0032202 A1 | 2/2012 | Ogata et al. | |
| 2012/0099304 A1* | 4/2012 | Kim | G06F 3/042 362/231 |
| 2012/0113621 A1* | 5/2012 | Lee | H01L 33/54 362/97.1 |
| 2017/0242178 A1* | 8/2017 | Tibbits | G02B 6/005 |

FOREIGN PATENT DOCUMENTS

| | | |
|---|---|---|
| JP | 2000-206456 | 7/2000 |
| JP | 2001-086533 | 3/2001 |
| JP | 2007-012517 | 1/2007 |
| JP | 2007-335182 | 12/2007 |
| JP | 2008-066086 | 3/2008 |
| JP | 2009-015132 | 1/2009 |
| JP | 2009-025774 | 2/2009 |
| JP | 2009-037803 | 2/2009 |
| JP | 2010-044921 | 2/2010 |
| JP | 2010-044941 | 2/2010 |
| JP | 2010-108824 | 5/2010 |
| JP | 2010-119617 | 6/2010 |
| JP | 2010-250301 | 11/2010 |
| JP | 2011-146167 | 7/2011 |
| JP | 2011-159632 | 8/2011 |
| JP | 2011-175102 | 9/2011 |
| JP | 2011-204371 | 10/2011 |
| JP | 2011-215548 | 10/2011 |
| JP | 2011-228090 | 11/2011 |
| JP | 2015-035336 | 2/2015 |
| WO | WO 2008/029911 | 3/2008 |
| WO | WO 2010/016199 | 2/2010 |
| WO | WO 2010/119617 | 10/2010 |

* cited by examiner

SURFACE LIGHT SOURCE DEVICE AND TRANSMISSION DISPLAY DEVICE

CROSS-REFERENCE TO RELATED APPLICATIONS

The present application claims priority under 35 U.S.C. § 119 to Japanese Patent Application No. 2015-150631, filed Jul. 30, 2015, entitled "Surface light source device and transmission type display device" and Japanese Patent Application No. 2016-137577, filed Jul. 12, 2016, entitled "Surface light source device and transmission type display device". The contents of these applications are incorporated herein by reference in their entirety.

BACKGROUND OF THE INVENTION

Technical Field

The present invention relates to a surface light source device and a transmission display device.

Discussion of the Background

Conventionally, illumination for a liquid crystal display (LCD) panel has been provided in such a manner that a light is applied from a side of the LCD panel with a cathode-ray tube, or a light is applied from a back surface with a parallel cathode-ray tube. A constant distance is provided between the cathode-ray tube and the LCD panel, and a light guide plate and a diffusion plate are disposed between them together with a plurality of sheets to converge the light on them.

Furthermore, recently, the LCD panel has been more likely to use a light emitting diode (LED) having point light sources which independently emit three light primary colors such as red, green, and blue, instead of the cathode-ray tube (refer to patent documents of Japanese Unexamined Patent Application Publication No. 2008-66086, Japanese Unexamined Patent Application Publication No. 2011-159632, and Japanese Unexamined Patent Application Publication No. 2011-204371). This LCD panel is used in a television or monitor and has been increasingly thinned.

SUMMARY OF THE INVENTION

According to one aspect of the present invention, a surface light source device comprises a base, light emitting elements, lenses, a first lenticular lens sheet, and a second lenticular lens sheet. The base has a base surface which is defined by an X axis and a Y axis perpendicular to the X axis and which is perpendicular to a Z axis. The light emitting elements are disposed on the base surface along the X-axis with an X pitch and along the Y axis with a Y pitch to form a matrix. The X pitch is smaller than the Y pitch. Lenses has a batwing illumination distribution. Each of the lenses covers each of the light emitting elements. The first lenticular lens sheet has a first lenticular lens sheet lower surface and a first lenticular lens sheet upper surface opposite to the first lenticular lens sheet lower surface in the Z axis. The first lenticular lens sheet is provided on the base such that the first lenticular lens sheet lower surface is opposite to the base surface. The first lenticular lens sheet has first grooves extending in the X axis on a side of the first lenticular lens sheet upper surface. The second lenticular lens sheet has a second lenticular lens sheet lower surface and a second lenticular lens sheet upper surface opposite to the second lenticular lens sheet lower surface in the Z axis. The second lenticular lens sheet is provided on the first lenticular lens sheet such that the second lenticular lens sheet lower surface is opposite to the first lenticular lens sheet upper surface. The second lenticular lens sheet has second grooves extending in the Y axis on a side of the second lenticular lens sheet upper surface.

According to another aspect of the present invention, a transmission display device comprises a display panel and a backlight for the display panel comprising the surface light source device according to the one aspect of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
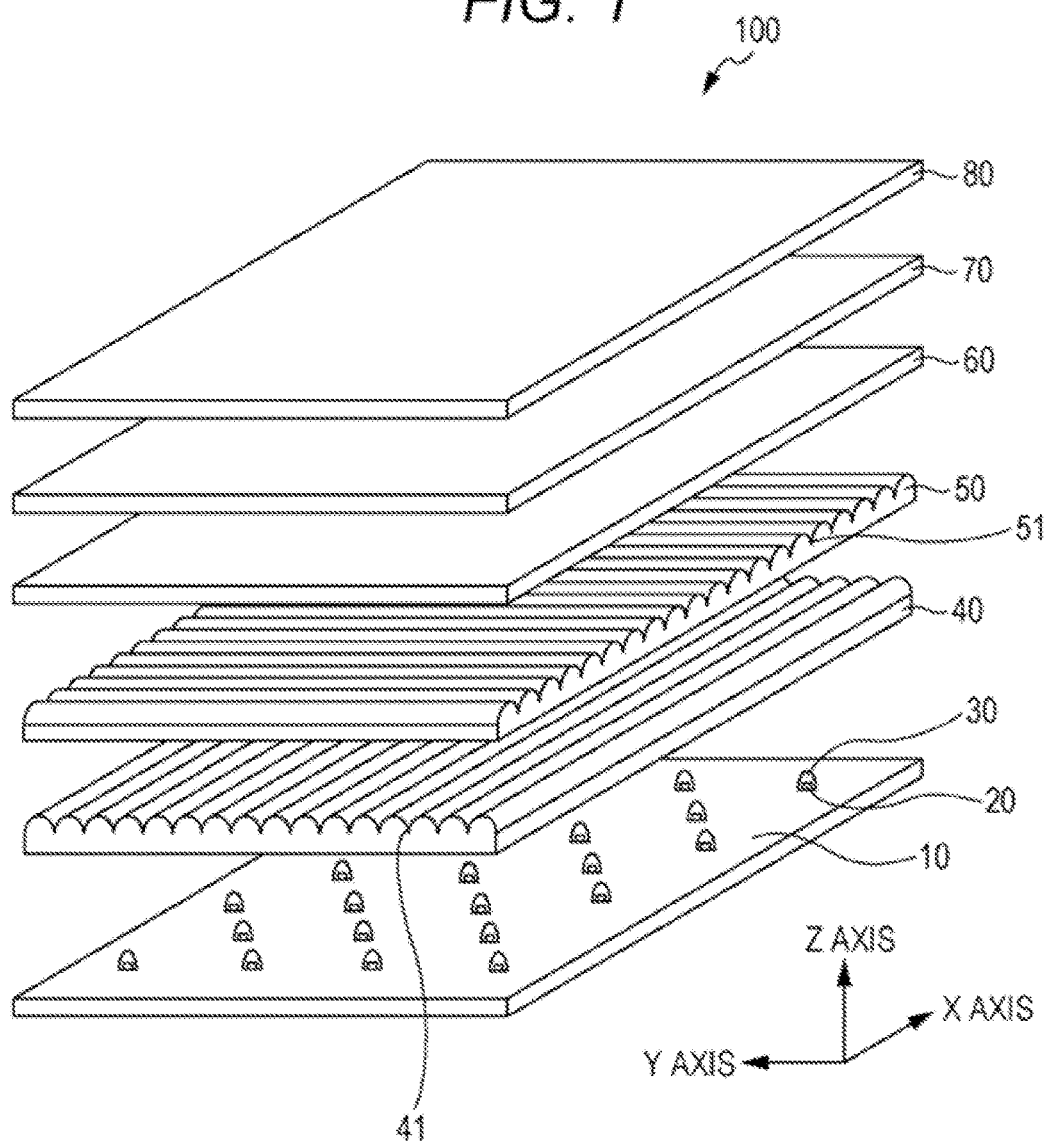
FIG. 1 is a schematic perspective view illustrating a surface light source device in a first embodiment.

The embodiments will now be described with reference to the accompanying drawings, wherein like reference numerals designate corresponding or identical elements throughout the various drawings.

Hereinafter, a description will be given to a surface light source device, a transmission type display device, and a method for manufacturing them in embodiments. However, the present invention is not limited to the embodiments and an example.

First Embodiment

Surface Light Source Device

Figure 2:
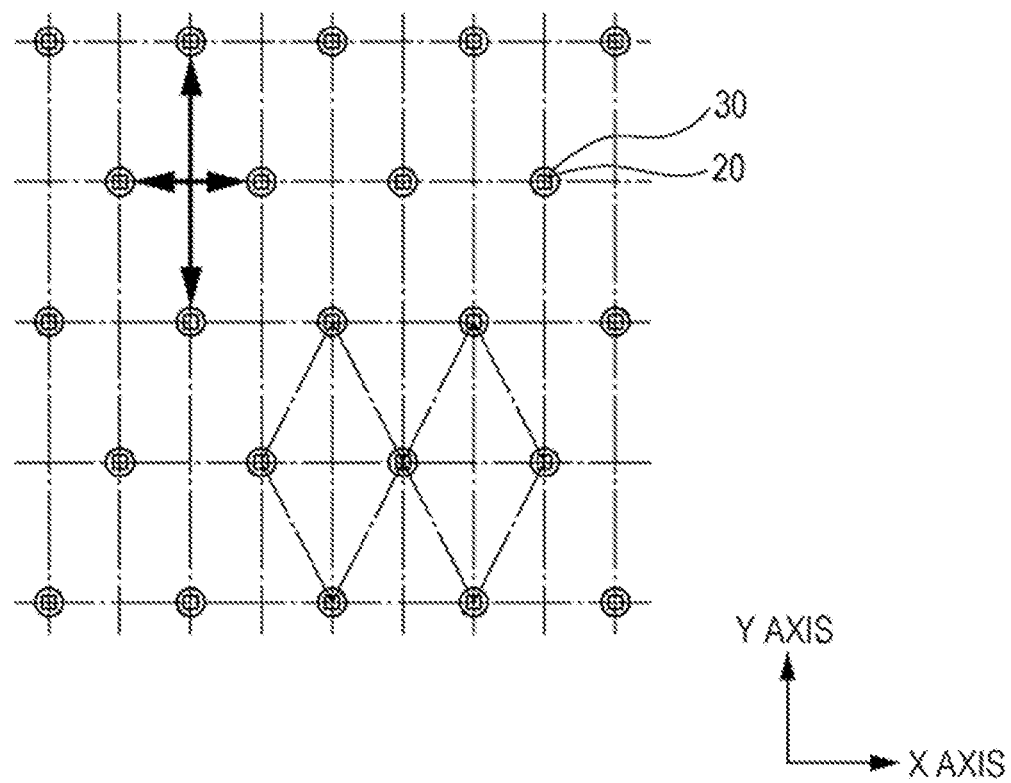
FIG. 2 is a schematic plan view illustrating positions of light emitting elements covered with lenses in the first embodiment.

A surface light source device in a first embodiment will be described with reference to the drawings. FIG. 1 is a schematic perspective view illustrating the surface light source device in the first embodiment. FIG. 1 illustrates sequential positions of components, and each distance between the components is not limited to that in the drawing. FIG. 2 is a schematic plan view illustrating positions of light emitting elements each having lenses in the first embodiment.

A surface light source device 100 sequentially includes, in a Z-axis direction, a base 10, a plurality of light emitting elements 20 disposed on the base 10 in a form of a matrix in an X-axis direction and a Y-axis direction, lenses 30 covering the light emitting elements 20, respectively and having a batwing illumination distribution, a first lenticular lens sheet 40 having a plurality of first grooves 41 along the X-axis direction, and a second lenticular lens sheet 50 having a plurality of second grooves 51 along the Y-axis direction. The surface light source device 100 may further sequentially include a fluorescent material sheet 60, a first prism sheet 70, and a second prism sheet 80 disposed in this order above the second lenticular lens sheet 50. Furthermore, sheets such as light transmission sheet and light diffusion sheet may be disposed between the above members. The many light emitting elements 20 each serving as point light sources are disposed on the base 10 in a two-dimensional manner on a planar surface along the X-axis direction and the Y-axis direction. The plurality of light emitting elements 20 are disposed in the X-axis direction and the Y-axis direction in the form of the matrix in such a manner that a pitch distance in the X-axis direction is smaller than a pitch distance in the Y-axis direction. When they are disposed in this manner, brightness unevenness can be reduced.

The pitch distance of the light emitting elements 20 in the Y-axis direction is preferably 1.2 times to 5.0 times longer than the pitch distance of the light emitting elements 20 in the X-axis direction, more preferably 1.35 times to 3.5 times, and most preferably 1.5 times to 2 times. When the pitch distances of the light emitting elements 20 disposed in the X-axis direction and the Y-axis direction are set within a predetermined range, the three adjacent light emitting elements 20 form an approximate triangle and they can be disposed in a form of a regular hexagon around the one light emitting element. Furthermore, the one light emitting element 20 and adjacently disposed other light emitting elements 20 may form an isosceles triangle, rhomboid, rectangle, or long and thin hexagon which is elongated in the Y-axis direction. When they are disposed in this manner, the number of the light emitting elements 20 can be reduced, and the brightness unevenness can be reduced.

Furthermore, the pitch distance of the light emitting elements 20 is not limited in particular, but the pitch distance of the light emitting elements 20 in the X-axis direction may be 5 mm to 100 mm, and the pitch distance of the light emitting elements 20 in the Y-axis direction may be 6 mm to 500 mm. In addition, the pitch distance of the light emitting elements 20 in the X-axis direction is preferably 5 mm to 80 mm, and the pitch distance of the light emitting elements 20 in the Y-axis direction is preferably 6.5 mm to 120 mm. In addition, the pitch distance of the light emitting elements 20 in the X-axis direction is more preferably 5 mm to 50 mm, and the pitch distance of the light emitting elements 20 in the Y-axis direction is more preferably 6.5 mm to 100 mm.

It is preferable that the light emitting elements 20 are disposed in a plurality of rows in the X-axis direction, and the light emitting elements 20 in the adjacent rows do not overlap with each other when viewed from the Y-axis direction. Furthermore, it is particularly preferable that the light emitting elements 20 are disposed in the plurality of rows in the X-axis direction, and the light emitting element 20 in the adjacent row is disposed in a center of the pitch of the light emitting elements 20 in the X-axis direction when viewed from the Y-axis direction.

It is preferable that the light emitting elements 20 are disposed in a plurality of columns in the Y-axis direction, and the light emitting elements 20 in the adjacent columns do not overlap with each other when viewed from the X-axis direction. Furthermore, it is particularly preferable that the light emitting elements 20 are disposed in the plurality of columns in the Y-axis direction, and the light emitting element 20 in the adjacent column is disposed in a center of the pitch of the light emitting elements 20 in the Y-axis direction when viewed from the X-axis direction.

In this way, when the light emitting elements 20 are disposed in the X-axis direction and the Y-axis direction in the form of the matrix in the zigzag manner, the number of the light emitting elements 20 can be reduced, and the brightness unevenness can be reduced.

A height of an upper surface of the light emitting element 20 from the base 10 is preferably small to provide a thin device. The light emitting element 20 is preferably mounted on the base 10 in a face-down manner, but it may be mounted in a face-up manner.

The light emitting element 20 and the lens 30 may be separate members, but the lens 30 preferably integrally covers the light emitting element 20 with a resin or glass.

A distance between the base 10 and the first lenticular lens sheet in the Z-axis direction is not limited in particular, but it is preferably 2 mm to 30 mm, more preferably 5 mm to 25 mm, and particularly preferably 10 mm to 20 mm. Thus, the surface light source device 100 can be thinned.

A distance between an upper surface of the lens 30 and a lower surface of the first lenticular lens sheet 40 in the Z-axis direction is preferably 0.1 to 0.6 of the pitch distance of the light emitting elements 20 in the X-axis direction, more preferably 0.1 to 0.4, and particularly preferably 0.1 to 0.3. Thus, the surface light source device 100 can be thinned.

A distance between the adjacent first grooves 41 in the first lenticular lens sheet 40 is preferably 150 μm to 550 μm, more preferably 200 μm to 450 μm, and particularly preferably 250 μm to 350 μm.

A distance between an upper end of the first lenticular lens sheet 40 and a lower surface of the second lenticular lens sheet 50 in the Z-axis direction is not limited in particular, but it is preferably 5 mm or less, more preferably 2 mm or less, and particularly preferably 1 mm or less. Furthermore, the first lenticular lens sheet 40 and the second lenticular lens sheet 50 may be in contact with each other. Thus, the surface light source device 100 can be thinned.

A distance between an upper end of the second lenticular lens sheet 50 and a lower surface of the fluorescent material sheet 60 in the Z-axis direction is not limited in particular, but it is preferably 5 mm or less, more preferably 2 mm or less, and particularly preferably 1 mm or less. Furthermore, the second lenticular lens sheet 50 and the fluorescent material sheet 60 may be in contact with each other. Thus, the surface light source device 100 can be thinned.

A distance between the fluorescent material sheet 60 and a lower surface of the first prism sheet 70 in the Z-axis direction is not limited in particular, but it is preferably 5 mm or less, more preferably 2 mm or less, and particularly preferably 1 mm or less. Furthermore, the fluorescent material sheet 60 and the first prism sheet 70 may be in contact with each other. Thus, the surface light source device 100 can be thinned.

A distance between the first prism sheet 70 and the second prism sheet 80 in the Z-axis direction is not limited in particular, but it is preferably 5 mm or less, more preferably 2 mm or less, and particularly preferably 1 mm or less. Furthermore, the first prism sheet 70 and the second prism sheet 80 may be in contact with each other. Thus, the surface light source device 100 can be thinned.

Hereinafter, each component will be described in detail.

Base

The base 10 may be a substrate or a flexible sheet. The substrate includes an aluminum substrate and a glass epoxy substrate. A reflection film is preferably formed of white resist disposed on the substrate. Alternatively, a reflection sheet may be disposed on the substrate. Thus, a light from the light emitting element 20 can be sent to the Z-axis direction (to an observer). The substrate may be a flexible substrate other than the one having predetermined strength. The flexible sheet may be made of resin, metal, or hybrid and have a thickness of 0.025 mm to 10 mm.

The base 10 may have an uneven surface other than a flat surface.

Light Emitting Element

The light emitting element 20 preferably emits a blue light. When the light emitting element 20 emits a single-color light, a color variation among the light emitting elements 20 can be reduced, and the brightness unevenness can be reduced. Furthermore, when the light emitting element 20 emits the single-color light, a sorting operation is not needed, and it is possible to save the trouble of mounting them on the base 10. When the light emitting element 20 emitting the blue light is used, it is preferable to use the fluorescent material sheet 60 containing a fluorescent material which emits a light excited by the light from the light emitting element 20. The fluorescent material sheet 60 may emit a yellow or orange light in response to the light from the light emitting element 20. Thus, it is possible to manufacture the surface light source device 100 which emits a white light. The light color of the fluorescent material sheet 60 is not limited to yellow or orange, and it may be a primary color of blue green, green, yellow green, or red, or may be an intermediate color of those.

The light emitting element 20 preferably emits a white light. When the light emitting element 20 emitting the white light is used, the fluorescent material sheet 60 is not needed. However, the light emitting element 20 emitting the white light may be used together with the primary color of blue green, green, yellow green, yellow, orange, or red, or their intermediate color as an auxiliary color.

The light emitting element 20 may emit a blue light, green light, and red light. When the light emitting element 20 emitting the light's three primary colors is used, the light emitting elements 20 emitting different light colors may be regularly disposed in a form of a triangle. In this case, the fluorescent material sheet 60 is not needed.

The light emitting element 20 may be a diced element, and the diced element may be mounted on a package or a substrate.

The diced element used as the light emitting element 20 is favorably a semiconductor light emitting element such as light emitting diode or laser diode. The semiconductor light emitting element is favorably formed on the substrate by laminating semiconductors such as ZnS, SiC, GaN, GaP, InN, AlN, ZnSe, GaAsP, GaAlAs, InGaN, GaAlN, AlInGaP, and AlInGaN by a method such as liquid phase growth method, HDVPE method, or MOCVD method. The semiconductor material can variously select light emission wavelengths ranging from ultraviolet light to infrared light by selecting a mixture rate, so that nitride gallium-based semiconductor expressed by $In_XAl_YGa_{1-X-Y}$ ($0 \leq X$, $0 \leq Y$, $X+Y \leq 1$) may be more favorably used.

Lens

Figure 3:
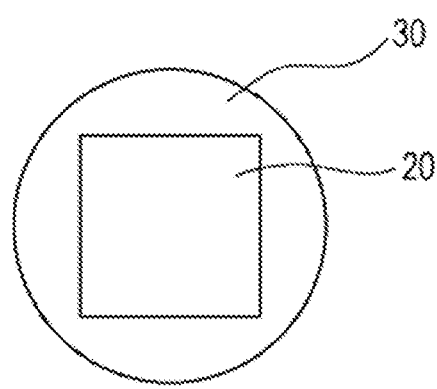
FIG. 3 is a schematic plan view illustrating a lens having a batwing illumination distribution in the first embodiment.
Figure 4A:
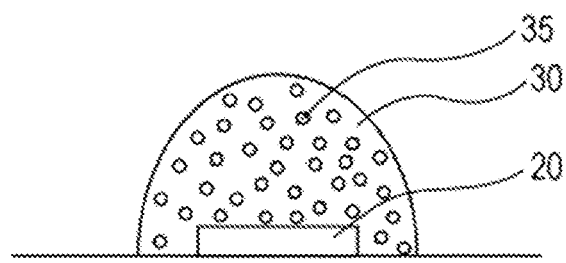
FIG. 4A is a schematic cross-sectional view illustrating a lens having a batwing illumination distribution in the first embodiment.
Figure 4B:
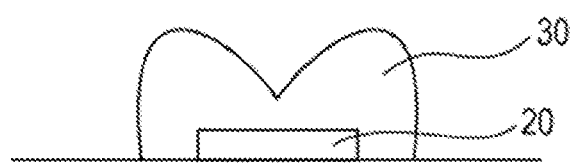
FIG. 4B is a schematic cross-sectional view illustrating a lens having a batwing illumination distribution in the first embodiment.
Figure 4C:
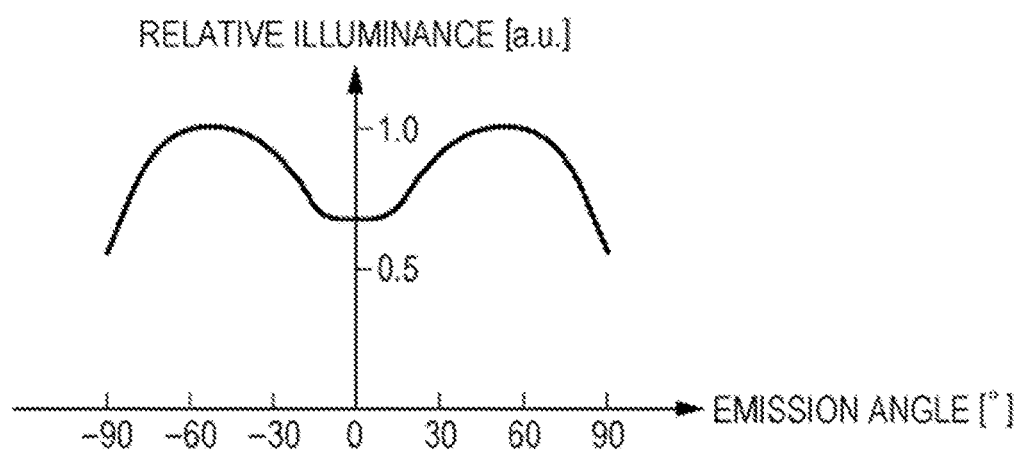
FIG. 4C is a schematic view illustrating a batwing illumination distribution.

FIG. 3 is a schematic plan view illustrating a lens having a batwing illumination distribution in the first embodiment. FIGS. 4A and 4B are schematic cross-sectional views illustrating lenses having the batwing illumination distribution in the first embodiment. FIG. 4C is a schematic view illustrating a batwing illumination distribution. In FIG. 4A, the lens 30 has the batwing illumination distribution because it contains a light diffusion material 35. In FIG. 4B, the lens 30 has the batwing illumination distribution because of its shape. When a concentration of the light diffusion material 35 is high, the light emitting element 20 cannot be recognized in some cases.

The lens 30 has the batwing illumination distribution. The batwing light distribution can efficiently expand the light emitted from the light emitting element 20 in the two-dimensional directions of the X axis and the Y axis, compared with Lambertian light distribution. That is, an intense light to be emitted just above the light emitting element 20 can be expanded in the two-dimensional directions of the X axis and the Y axis. Thus, the brightness unevenness can be more likely to be reduced.

A material of the lens 30 is not limited in particular as long as the material can efficiently transmit the light from the light emitting element 20. For example, it may be a thermoplastic resin, thermosetting resin, or grass. For example, it may be a silicone resin, silicone modified resin, epoxy resin, epoxy modified resin, urea resin, phenol resin, polycarbonate resin, acrylic resin, polymethylpentene resin, polynorbornene resin, polyphthalamine resin, polyphthalamide resin, liquid crystal polymer, or hybrid resin containing one or more kinds of the above resins. Especially, epoxy resin, silicone resin, and acrylic resin are preferable in view of mass production.

A size of the lens 30 is not limited in particular, but a height from the base 10 to an upper end of the lens 30 may be 0.05 mm to 10 mm, preferably 0.1 mm to 5 mm, and particularly preferably 0.2 mm to 3 mm.

The light diffusion material 35 contained in the lens 30 may be white pigment particles of $TiO_2$ (titanium oxide), $ZrO_2$ (zirconium oxide), MgO (magnesium oxide), $MgCO_3$ (magnesium carbonate), $Mg(OH)_2$ (magnesium hydroxide), $CaCO_3$ (calcium carbonate), $Ca(OH)_2$ (calcium hydroxide), $CaSiO_3$ (calcium silicate), ZnO (zinc oxide), $BaTiO_3$ (barium titanate), $Al_2O_3$ (aluminum oxide), or resin filler.

First Lenticular Lens Sheet, and Second Lenticular Lens Sheet

Figure 5:
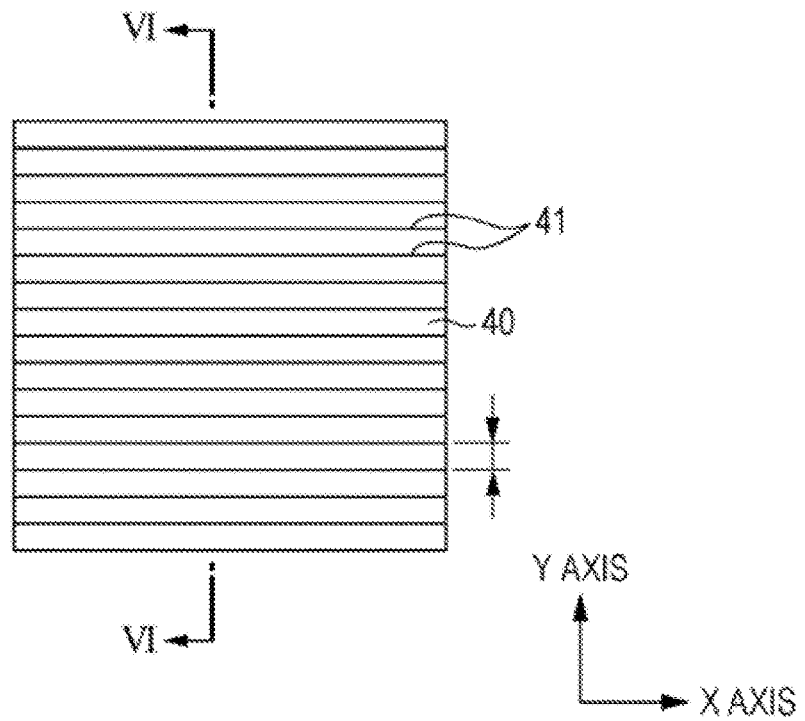
FIG. 5 is a schematic plan view illustrating a first lenticular lens sheet in the first embodiment.
Figure 6:
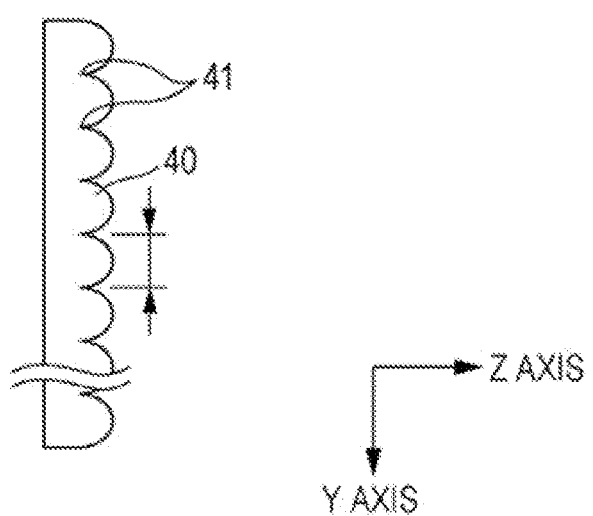
FIG. 6 is a schematic cross-sectional view illustrating the first lenticular lens sheet in the first embodiment.
Figure 7:
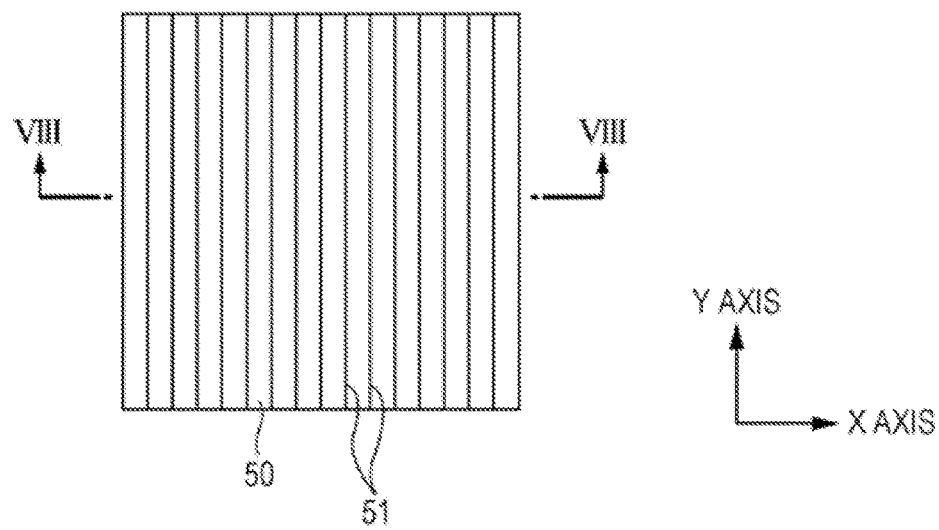
FIG. 7 is a schematic plan view illustrating a second lenticular lens sheet in the first embodiment.
Figure 8:
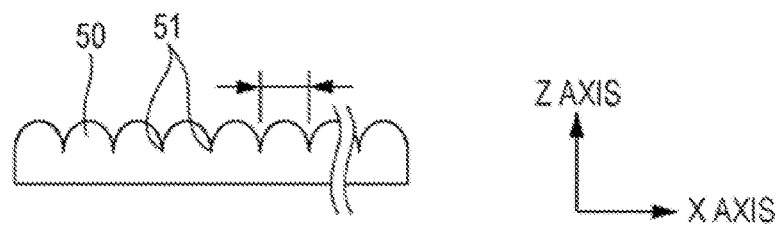
FIG. 8 is a schematic cross-sectional view illustrating the second lenticular lens sheet in the first embodiment.

FIG. 5 is a schematic plan view illustrating the first lenticular lens sheet in the first embodiment. FIG. 6 is a schematic cross-sectional view illustrating the first lenticular lens sheet in the first embodiment. FIG. 6 illustrates a partially enlarged schematic cross-sectional surface taken along a line XI-XI in FIG. 5. FIG. 7 is a schematic plan view illustrating the second lenticular lens sheet in the first embodiment. FIG. 8 is a schematic cross-sectional view illustrating the second lenticular lens sheet in the first embodiment. FIG. 8 illustrates a partially enlarged schematic cross-sectional surface taken along a line XIII-XIII in FIG. 7.

The first lenticular lens sheet 40 has the plurality of first grooves 41 formed along the X-axis direction. The first grooves 41 are formed in an upper surface of the first lenticular lens sheet 40. The term "along the X-axis direction" means that they are parallel to the X-axis direction, but they may be rotated with respect to the X-axis direction by a predetermined angle such as 20 degrees or less in the planar surface along the X axis and the Y axis. The plurality of light emitting elements 20 are disposed in the X-axis direction and the Y-axis direction in the form of the matrix, and accordingly the first lenticular lens sheet 40 is preferably disposed along the X-axis direction, but it may be rotated by the predetermined angle to the extent that the effect against the brightness unevenness can be maintained.

The second lenticular lens sheet 50 has the plurality of second grooves 51 formed along the Y-axis direction. The second grooves 51 are formed in an upper surface of the second lenticular lens sheet 50. The term "along the Y-axis direction" means that they are parallel to the Y-axis direction, but they may be rotated with respect to the Y-axis direction by a predetermined angle such as 20 degrees or less in the planar surface along the X axis and the Y axis. The plurality of light emitting elements 20 are disposed in the X-axis direction and the Y-axis direction in the form of the matrix, and accordingly the second lenticular lens sheet 50 is preferably disposed along the Y-axis direction, but it may be rotated by the predetermined angle to the extent that the effect against the brightness unevenness can be maintained.

A thickness of the first lenticular lens sheet 40 and a thickness of the second lenticular lens sheet 50 are preferably 0.25 mm to 8.0 mm, more preferably 0.5 mm to 4.0 mm, and particularly preferably 1.0 mm to 2.0 mm. Thus, the surface light source device 100 can be thinned while predetermined strength is maintained.

As for a shape of the first groove 41 in a cross-sectional surface of the first lenticular lens sheet 40 taken along the Y-axis and Z-axis directions, a corner portion may be rounded and a shape of a projection portion may be curved.

As for a shape of the second groove 51 in a cross-sectional surface of the second lenticular lens sheet 50 taken along the Y-axis and Z-axis directions, a corner portion may be rounded and a shape of a projection portion may be curved.

A distance between the first grooves 41 of the first lenticular lens sheet 40, and a distance between the second grooves 51 of the second lenticular lens sheet 50 are preferably 150 μm to 550 μm, more preferably 200 μm to 450 μm, and particularly preferably 250 μm to 350 μm. The distance between the first grooves 41 of the first lenticular lens sheet 40 means a distance between the adjacent first grooves 41 in the X-axis direction.

A depth of the first groove 41 of the first lenticular lens sheet 40, and a depth of the second groove 51 of the second lenticular lens sheet 50 are preferably 120 μm to 440 μm, more preferably 160 μm to 360 μm, and particularly preferably 200 μm to 280 μm.

The depth of the first groove 41 is preferably 0.5 time to 1.1 times larger than the distance between the first grooves 41 of the first lenticular lens sheet 40, more preferably 0.6 time to 1.0 time, and particularly preferably 0.7 time to 0.9 time.

The depth of the second groove 51 is preferably 0.5 time to 1.1 times larger than the distance between the second grooves 51 of the second lenticular lens sheet 50, more preferably 0.6 time to 1.0 time, and particularly preferably 0.7 time to 0.9 time.

A material of the first lenticular lens sheet 40 and the second lenticular lens sheet 50 is not limited in particular as long as the material efficiently transmits the light from the light emitting element 20. For example, it may be a thermoplastic resin, thermosetting resin, or grass. For example, it may be a silicone resin, silicone modified resin, epoxy resin, epoxy modified resin, urea resin, phenol resin, polycarbonate resin, acrylic resin, polymethylpentene resin, polynorbornene resin, polyphthalamine resin, polyphthalamide resin, liquid crystal polymer, or hybrid resin containing one or more kinds of the above resins. Especially, epoxy resin, silicone resin, and acrylic resin are preferable in view of mass production.

The first lenticular lens sheet 40 and the second lenticular lens sheet 50 preferably contain 2 wt % to 25 wt % of light diffusion material, more preferably 3 wt % to 15 wt %, and particularly preferably 5 wt % to 10 wt %. When the first lenticular lens sheet 40 and the second lenticular lens sheet 50 contain the light diffusion material, the light emitted from the light emitting element 20 in the Z-axis direction in the most direct way can be diffused, so that the brightness unevenness can be reduced.

The light diffusion material may be white pigment particles of $TiO_2$ (titanium oxide), $ZrO_2$ (zirconium oxide), MgO (magnesium oxide), $MgCO_3$ (magnesium carbonate), $Mg(OH)_2$ (magnesium hydroxide), $CaCO_3$ (calcium carbonate), $Ca(OH)_2$ (calcium hydroxide), $CaSiO_3$ (calcium silicate), ZnO (zinc oxide), $BaTiO_3$ (barium titanate), or $Al_2O_3$ (aluminum oxide).

Fluorescent Material Sheet

The surface light source device 100 may include the fluorescent material sheet 60 disposed on the second lenticular lens sheet 50.

The fluorescent material sheet 60 preferably contains quantum dots.

A thickness of the fluorescent material sheet 60 is not limited in particular as long as the light from the light emitting element 20 can be efficiently excited and emitted, and the thickness may be 10 μm to 300 μm. The thickness of the fluorescent material sheet 60 is preferably 50 μm to 250 μm, and particularly preferably 100 μm to 200 μm.

A fluorescent material of the fluorescent material sheet 60 is excited by the light from the light emitting element 20 and emits a light. The fluorescent material includes cerium-activated YAG (yttrium aluminum garnet)-based fluorescent material which emits green to yellow light, cerium-activated LAG (lutetium aluminum garnet)-based fluorescent material which emits green light, europium and/or chrome-activated nitrogen-containing calcium aluminosilicate ($CaO$—$Al_2O_3$—$SiO_2$)-based fluorescent material which emits green to red light, europium-activated silicate ($(Sr, Ba)_2SiO_4$)-based fluorescent material which emits blue to red light, β sialon fluorescent material which emits green light, nitride-based fluorescent material such as CASN-based fluorescent material expressed by $CaAlSiN_3$:Eu or SCASN-based fluorescent material expressed by (Sr, Ca) $AlSiN_3$:Eu which emits red light, KSF ($K_2SiF_6$:Mn)-based fluorescent material which emits red light, and sulfide-based fluorescent material which emits red light.

Prism Sheet and Others

The surface light source device 100 may further include the first prism sheet 70 and the second prism sheet 80 on the second lenticular lens sheet 50 or the fluorescent material sheet 60. When the first prism sheet 70 is disposed on the fluorescent material sheet 60, the light reflected by the first prism sheet 70 and supposed to be returned toward the light emitting element 20 can be absorbed or reflected by the fluorescent material sheet 60 and returned to the first prism sheet 70 again.

A plurality of prism sheets may be used, or one prism sheet having uneven surfaces on both sides may be used. The prism sheet is used to efficiently extract the light from the light emitting element 20 in the Z-axis direction (to the observer direction). That is, while the first lenticular lens sheet 40 and the second lenticular lens sheet 50 serve as members to expand the light from the light emitting element 20 in the planar direction along the X axis and the Y axis, the first prism sheet 70 and the second prism sheet 80 serve as members to converge the light expanded in the planar direction along the X axis and the Y axis, in the Z-axis direction.

The first prism sheet 70 and the second prism sheet 80 may have many recess portions and projection portions formed randomly or regularly on their surfaces. A size of the projection portion may be 0.1 μm to 5 μm.

Furthermore, the first prism sheet 70 may have grooves in the X-axis direction, and the second prism sheet 80 may have grooves in the Y-axis direction. When the first prism sheet 70 and the second prism sheet 80 are perpendicular to each other, front brightness can be enhanced. A distance between the grooves and a depth of the groove are not limited in particular.

A material of the first prism sheet 70 and the second prism sheet 80 may be a well-known material. Furthermore, the first prism sheet 70 and the second prism sheet 80 may contain a light diffusion material.

Although not illustrated, a spacer may be provided between the base 10 and the first lenticular lens sheet 40, so that a space between the base 10 and the first lenticular lens sheet 40 can be controlled. For example, a clear and colorless sheet or film may be used.

Furthermore, a polarization sheet or a light diffusion sheet may be provided on the first prism sheet 70 and the second prism sheet 80.

Light Emitting State of Surface Light Source Device

Figure 9:
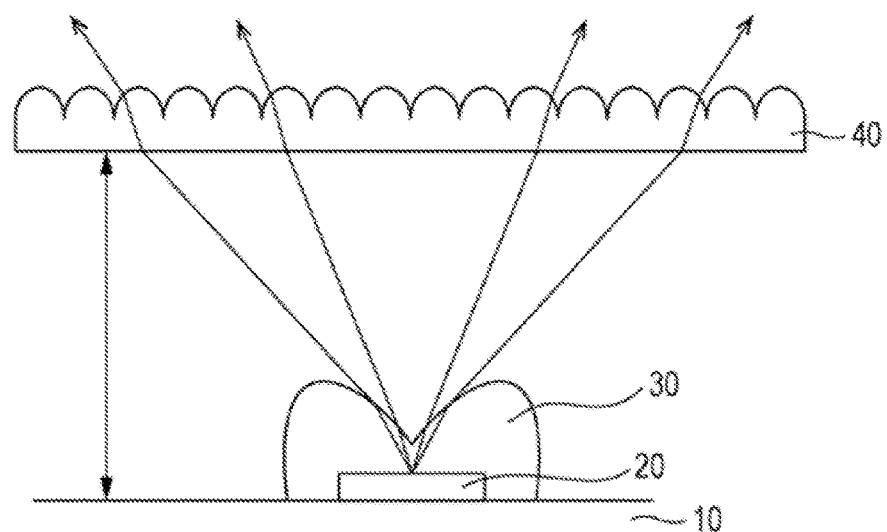
FIG. 9 is a schematic cross-sectional view illustrating a path of a light emitted from a light emitting element and passing through the first lenticular lens sheet in the first embodiment.
Figure 10:
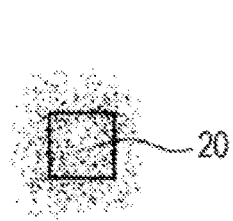
FIG. 10 is a schematic plan view illustrating a light emitting state of the light emitting element in the first embodiment.
Figure 11:
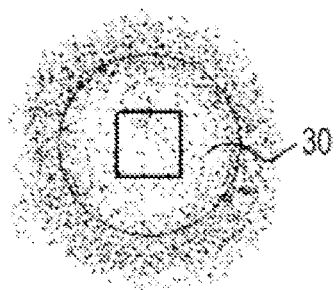
FIG. 11 is a schematic plan view illustrating a light emitting state after the light has passed through the lens in the first embodiment.
Figure 12:
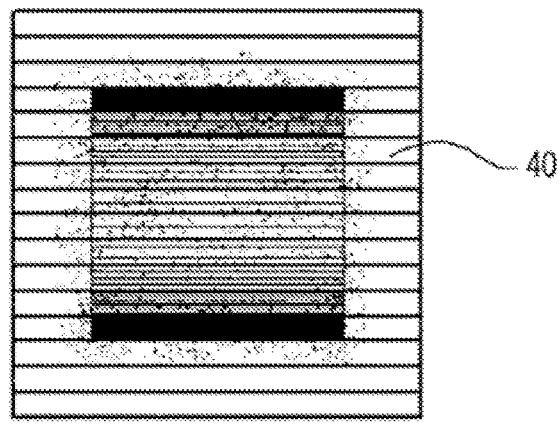
FIG. 12 is a schematic plan view illustrating a light emitting state after the light has passed through the first lenticular lens sheet in the first embodiment.
Figure 13:
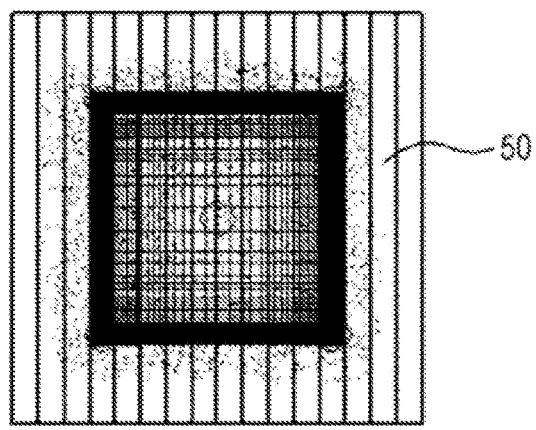
FIG. 13 is a schematic plan view illustrating a light emitting state after the light has passed through the second lenticular lens sheet in the first embodiment.

FIG. 9 is a schematic cross-sectional view illustrating a light path of the light emitted from the light emitting element and passing through the first lenticular lens sheet in the first embodiment. FIG. 10 is a schematic plan view illustrating a light emitting state of the light emitting element in the first embodiment. FIG. 11 is a schematic plan view illustrating a light emitting state after the light has passed through the lens in the first embodiment. FIG. 12 is a schematic plan view illustrating a light emitting state after the light has passed through the first lenticular lens sheet in the first embodiment. FIG. 13 is a schematic plan view illustrating a light emitting state after the light has passed through the second lenticular lens sheet in the first embodiment.

A description will be given to light behavior and brightness unevenness in the first lenticular lens sheet 40 in the cross-sectional surface along the Y axis and Z axis. In addition, the light diffusion material is not illustrated for the sake of simple description.

As for the brightness unevenness in the surface light source device 100, in many cases, brightness is high in the vicinity of a part just above the light emitting element 20 serving as the light emitting source, and it is low in the vicinity of a part furthest from the light emitting element 20 serving as the light emitting source, that is, a part just above a middle position between the adjacent light emitting elements 20.

First, the light emitted from the light emitting element 20 passes through the lens 30. The lens 30 is formed to have the batwing illumination distribution. Thus, the lens 30 having the batwing illumination distribution diffuses the light in the vicinity of the part just above the light emitting element 20, to the planar direction along the X axis and the Y axis, so that the light is prevented from becoming high in brightness in the vicinity of the part just above the light emitting element 20.

The first grooves 41 and the linear projection portions of the first lenticular lens sheet 40 mainly diffuse the light in the Y-axis direction after the light has passed through the lens 30, and the light is prevented from becoming high in brightness in the vicinity of the part just above the light emitting element 20. Thus, the first grooves 41 and the linear projection portions of the first lenticular lens sheet 40 formed along the X-axis direction contribute to expanding an orientation in the Y-axis direction.

Thus, the second grooves 51 and the linear projection portions of the second lenticular lens sheet 50 mainly diffuse the light in the X-axis direction after the light has passed through the first lenticular lens sheet 40, and the light is prevented from becoming high in brightness in the vicinity of the part just above the light emitting element 20. Thus, the second grooves 51 and the linear projection portions of the second lenticular lens sheet 50 formed along the Y-axis direction contribute to expanding an orientation in the X-axis direction.

In this way, when the light emitted from the light emitting element 20 passes through the lens 30, the first lenticular lens sheet 40 and the second lenticular lens sheet 50 in this order, the light can be prevented from concentrating on the part just above the light emitting element 20, and the orientation of the light emitting element 20 can be expanded. Thus, the brightness unevenness can be reduced.

In addition, when the adjacent light emitting elements 20 are disposed in the zigzag manner, the brightness unevenness can be also reduced.

Furthermore, when the three adjacent light emitting elements 20 form the approximate triangle, and the light emitting elements are disposed in the form of the regular hexagon around the one light emitting element, the brightness unevenness of the surface light source device 100 can be reduced.

However, since the first lenticular lens sheet 40 is disposed nearer to the light emitting element 20 than the second lenticular lens sheet 50, the light diffusion effect of the first lenticular lens sheet 40 in the Y-axis direction is stronger than the light diffusion effect of the second lenticular lens sheet 50 in the X-axis direction. This effect becomes more conspicuous depending on the thicknesses and the distance of the first lenticular lens sheet 40 and the second lenticular lens sheet 50. In this case, when the light emitting elements 20 are disposed such that the pitch distance in the X-axis direction is smaller than the pitch distance in the Y-axis direction, the brightness unevenness can be reduced.

Transmission Type Display Device

In the transmission type display device, the surface light source device 100 is used as a backlight for a display panel. The surface light source device 100 may be combined with a LCD panel.

Second Embodiment

Figure 14:
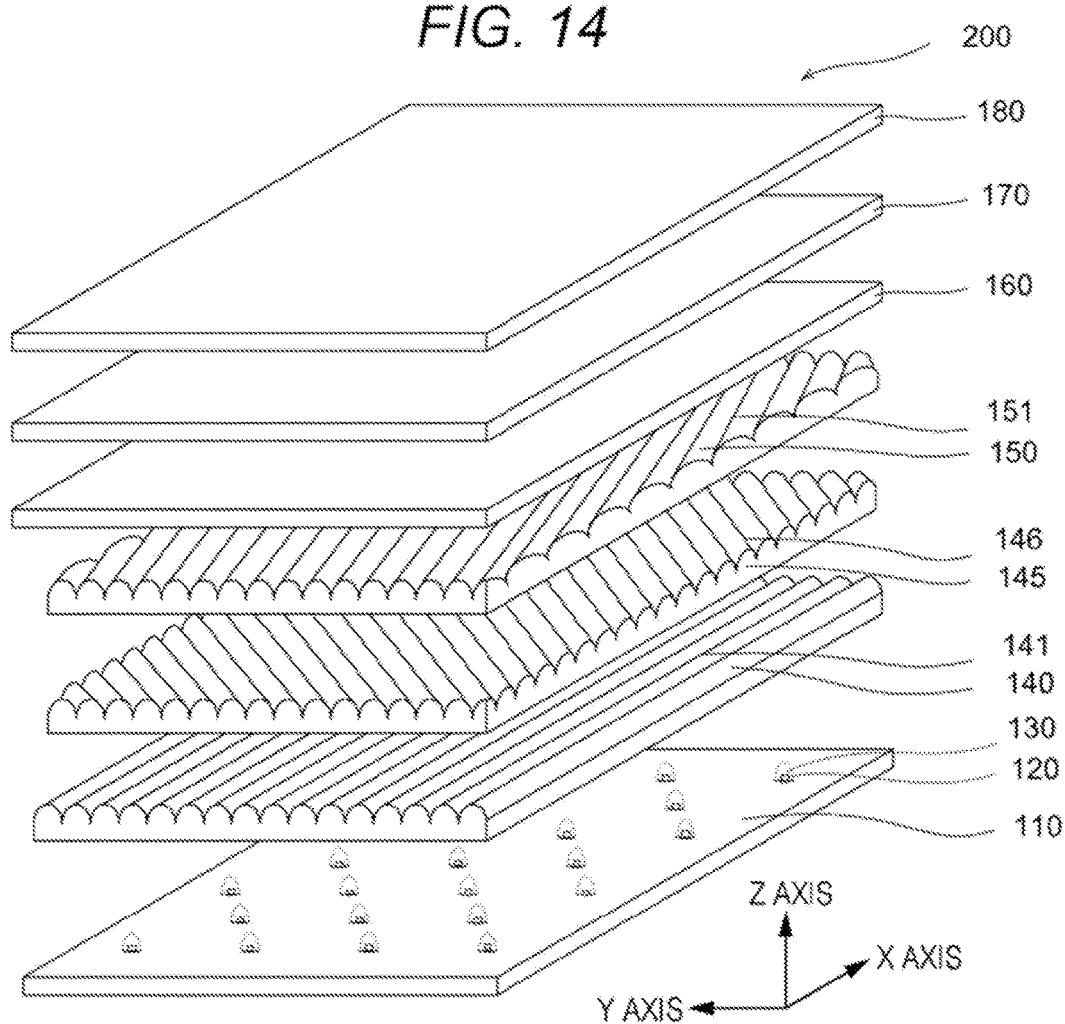
FIG. 14 is a schematic perspective view illustrating a surface light source device in a second embodiment.
Figure 15:
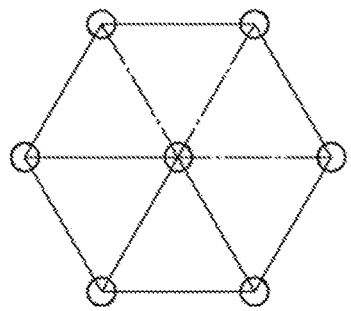
FIG. 15 is a schematic plan view illustrating a light emitting state after a light has passed through a third lenticular lens sheet in the second embodiment.

FIG. 14 is a schematic perspective view illustrating a surface light source device in the second embodiment. FIG. 15 is a schematic plan view illustrating a light emitting state after the light has passed through a third lenticular lens sheet in the second embodiment. Here, the view is simplified for the sake of description.

A surface light source device 200 in the second embodiment sequentially includes, in a Z-axis direction, a base 110, a plurality of light emitting elements 120 disposed on the base 110 in a form of a matrix in an X-axis direction and a Y-axis direction, lenses 130 covering the light emitting elements 120 and having a batwing illumination distribution, a first lenticular lens sheet 140 having a plurality of first grooves 141 along the X-axis direction, a second lenticular lens sheet 145 having a plurality of second grooves 146 along a direction rotated by 60 degrees with respect to the X-axis direction in a planar surface along the X axis and the Y axis, and a third lenticular lens sheet 150 having a plurality of third grooves 151 along a direction rotated by 120 degrees toward the same rotation direction as the second lenticular lens sheet 145 with respect to the X-axis direction in the planar surface along the X axis and the Y axis. The plurality of light emitting elements 120 are disposed on the base 110 in the form of the matrix in the X-axis direction and the Y-axis direction in such a manner that a pitch distance in the X-axis direction is smaller than a pitch distance in the Y-axis direction. The surface light source device 200 in the second embodiment is different from the surface light source device 100 in the first embodiment in that the one lenticular lens sheet is added, and a disposition angle differs between the second lenticular lens sheet 145 and the third lenticular lens sheet 150.

First, similar to the first embodiment, a light is emitted from the light emitting element 120 and then passes through the lens 130.

The first grooves 141 and linear projection portions of the first lenticular lens sheet 140 mainly diffuse the light in the Y-axis direction after the light has passed through the lens 130, and the light is prevented from becoming high in brightness in the vicinity of a part just above the light emitting element 120.

Furthermore, the second grooves 146 and the linear projection portions of the second lenticular lens sheet 145 mainly diffuse the light to a direction rotated by 150 degrees with respect the X-axis direction after the light has passed through the first lenticular lens sheet 140, and the light is prevented from becoming high in brightness in the vicinity of the part just above the light emitting element 120.

Furthermore, the third grooves 151 and the linear projection portions of the third lenticular lens sheet 150 mainly diffuse the light to a direction rotated by 210 degrees with respect the X-axis direction after the light has passed through the second lenticular lens sheet 145, and the light is prevented from becoming high in brightness in the vicinity of the part just above the light emitting element 120.

In this way, when the light emitted from the light emitting element 120 sequentially passes through the lens 130, the first lenticular lens sheet 140, the second lenticular lens sheet 145, and the third lenticular lens sheet 150, the light is prevented from converging on the part just above the light emitting element 120, so that the brightness unevenness can be reduced. The light emitted from the one light emitting element forms a hexagon provided as an image.

Third Embodiment

Figure 16:
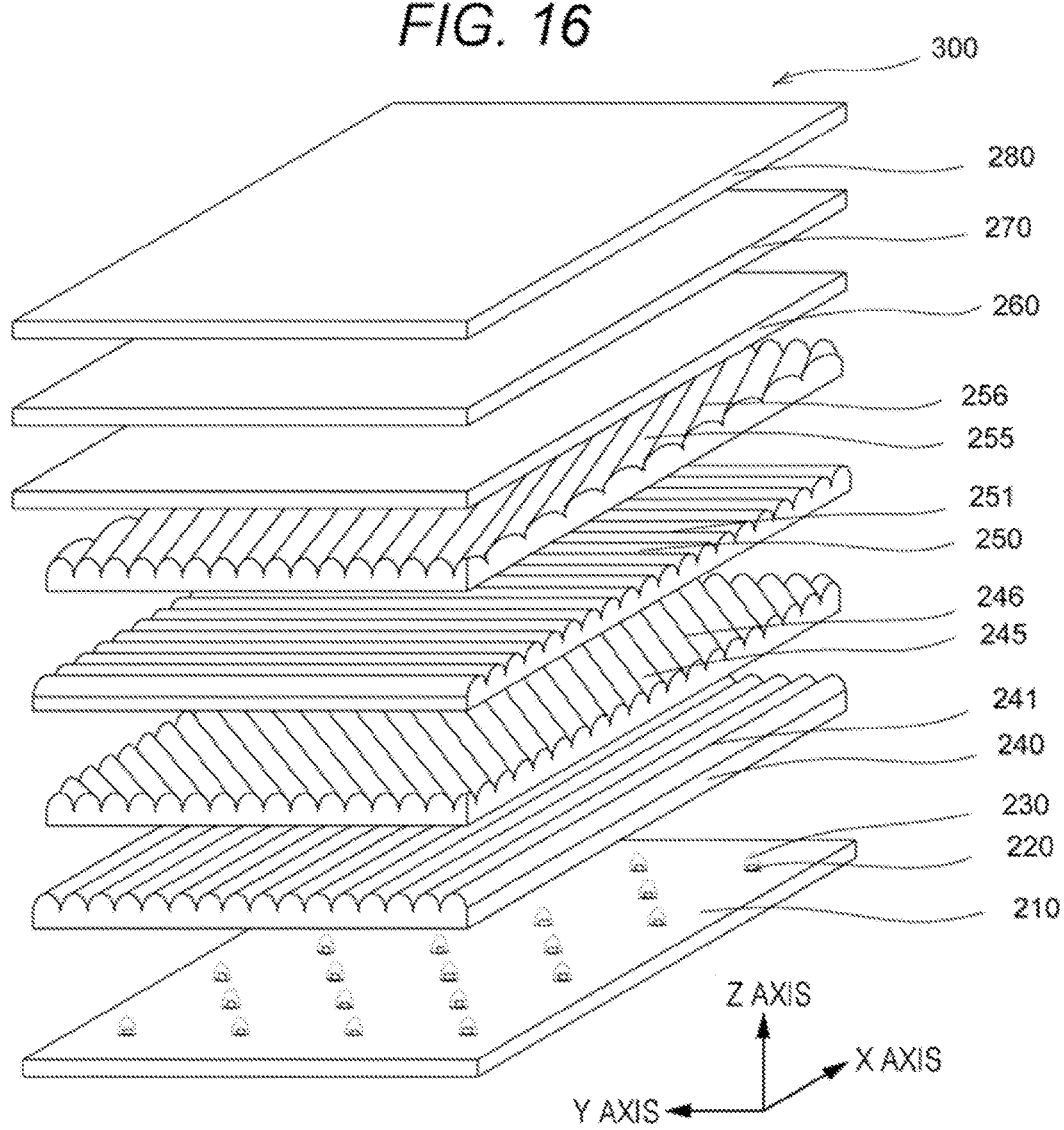
FIG. 16 is a schematic perspective view illustrating a surface light source device in a third embodiment.
Figure 17:
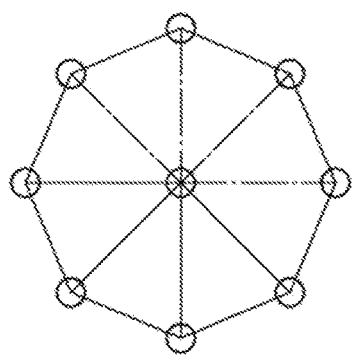
FIG. 17 is a schematic plan view illustrating a light emitting state after a light has passed through a fourth lenticular lens sheet in the third embodiment.

FIG. 16 is a schematic perspective view illustrating a surface light source device in the third embodiment. FIG. 17 is a schematic plan view illustrating a light emitting state after the light has passed through a fourth lenticular lens sheet in the third embodiment. Here, the view is simplified for the same of description.

A surface light source device 300 in the third embodiment sequentially includes, in a Z-axis direction, a base 210, a plurality of light emitting elements 220 disposed on the base 210 in a form of a matrix in an X-axis direction and a Y-axis direction, lenses 230 covering the light emitting elements 220 and having a batwing illumination distribution, a first lenticular lens sheet 240 having a plurality of first grooves 241 along the X-axis direction, a second lenticular lens sheet 245 having a plurality of second grooves 246 along a direction rotated by 45 degrees with respect to the X-axis direction in a planar surface of the X axis and the Y axis, a third lenticular lens sheet 250 having a plurality of third grooves 251 along a direction rotated by 90 degrees with respect to the X-axis direction in the planar surface along the X axis and the Y axis, a fourth lenticular lens sheet 255 having a plurality of fourth grooves 256 along a direction rotated by 135 degrees with respect to the X-axis direction in the planar surface along the X axis and the Y axis. The plurality of light emitting elements 220 are disposed on the base 210 in the form of the matrix in the X-axis direction and the Y-axis direction in such a manner that a pitch distance in the X-axis direction is smaller than a pitch distance in the Y-axis direction. The surface light source device 300 in the third embodiment is different from the surface light source device 100 in the first embodiment in that the two lenticular lens sheets are added, and a disposition angle differs among the second lenticular lens sheet 245, the third lenticular lens sheet 250, and the fourth lenticular lens sheet 255.

First, similar to the first embodiment, a light is emitted from the light emitting element 220 and passes through the lens 230.

The first grooves 241 and linear projection portions of the first lenticular lens sheet 240 mainly diffuse the light in the Y-axis direction after the light has passed through the lens 230, and the light is prevented from becoming high in brightness in the vicinity of a part just above the light emitting element 220.

Next, the second grooves 246 and linear projection portions of the second lenticular lens sheet 245 mainly diffuse the light to a direction rotated by 135 degrees with respect the X-axis direction after the light has passed through the first lenticular lens sheet 240, and the light is prevented from becoming high in brightness in the vicinity of the part just above the light emitting element 220.

Then, the third grooves 251 and linear projection portions of the third lenticular lens sheet 250 mainly diffuse the light to a direction rotated by 180 degrees with respect the X-axis direction after the light has passed through the second lenticular lens sheet 245, and the light is prevented from becoming high in brightness in the vicinity of the part just above the light emitting element 220.

Next, the fourth grooves 256 and linear projection portions of the fourth lenticular lens sheet 255 mainly diffuse the light to a direction rotated by 225 degrees with respect the X-axis direction after the light has passed through the third lenticular lens sheet 250, and the light is prevented from becoming high in brightness in the vicinity of the part just above the light emitting element 220.

In this way, when the light emitted from the light emitting element 220 sequentially passes through the lens 230, the first lenticular lens sheet 240, the second lenticular lens sheet 245, the third lenticular lens sheet 250, and the fourth lenticular lens sheet 255, the light is prevented from converging on the part just above the light emitting element 220, so that the brightness unevenness can be reduced. The light emitted from the one light emitting element forms an octagon provided as an image.

EXAMPLE

Example 1

In Example 1, a description for a part similar to the first embodiment is not occasionally given.

A device includes a base 10, a plurality of light emitting elements 20 disposed on the base 10 in a form of a matrix in an X-axis direction and a Y-axis direction, lenses 30 covering the light emitting elements 20 and having a batwing illumination distribution, a first lenticular lens sheet 40 having a plurality of first grooves 41 along the X-axis direction, a second lenticular lens sheet 50 having a plurality of second grooves 51 along the Y-axis direction, a fluorescent material sheet 60, a first prism sheet, and a second prism sheet 80 which are sequentially disposed in this order.

The base 10 is a glass epoxy substrate.

The plurality of light emitting elements 20 are disposed on the base 10 in the form of the matrix in the X-axis direction and the Y-axis direction. The light emitting elements 20 are disposed in a zigzag manner in which the three adjacent light emitting elements 20 form an approximate triangle, and the light emitting elements are disposed in a form of an approximate hexagon around the one light emitting element. A pitch distance between the adjacent light emitting elements 20 is 35 mm, a pitch distance between the light emitting elements 20 in the X-axis direction is 35 mm, and a pitch distance between the light emitting elements 20 in the Y-axis direction is 60.6 mm.

The light emitting element 20 is a blue light emitting element having a light emission peak near 450 nm to 460 nm. The light emitting element 20 is made of gallium nitride-based compound semiconductor. The light emitting element 20 is covered with the lens 30 containing a light diffusion material and having the batwing illumination distribution. The lens 30 is made of silicone resin.

An upper surface of the first lenticular lens sheet 40 has the plurality of first grooves 41 along the X-axis direction. An upper surface of the second lenticular lens sheet 50 has the plurality of second grooves 51 along the Y-axis direction. A thickness of the first lenticular lens sheet 40 and a thickness of the second lenticular lens sheet 50 are 1.5 mm. A distance between the adjacent first grooves 41 and a distance between the adjacent second grooves 51 are 280 μm, a depth of the first groove 41 and a depth of the second groove 51 are about 220 μm. A projection portion of the first lenticular lens sheet 40 is curved in a cross-sectional surface along the Y axis and the Z axis, and a projection portion of the second lenticular lens sheet 50 is curved in a cross-sectional surface along the X axis and the Z axis.

A distance between an upper surface of the base 10 and a lower surface of the first lenticular lens sheet 40 is 14 mm. The first lenticular lens sheet 40, the second lenticular lens sheet 50, the fluorescent material sheet 60, the first prism sheet 70, and the second prism sheet 80 are directly in contact with each other.

In this configuration, the brightness unevenness can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A surface light source device comprising:
a base having a base surface which is defined by an X axis and a Y axis perpendicular to the X axis and which is perpendicular to a Z axis;
light emitting elements disposed on the base surface along the X-axis with an X pitch and along the Y axis with a Y pitch to form a matrix, the X pitch being smaller than the Y pitch, the light emitting elements being arranged such that one light emitting element among the light emitting elements is surrounded by six adjacent light emitting elements defining a hexagon having a center at which the one light emitting element is positioned, an X-distance between the one light emitting element and each of the six adjacent light emitting elements along the X-axis being smaller than or equal to the X pitch, a Y-distance between the one light emitting element and each of the six adjacent light emitting elements along the Y-axis being smaller than the Y pitch, a first ratio of the Y pitch to double of the X pitch being larger than $\sqrt{3}/2$;
lenses having a batwing illumination distribution, each of the lenses covering each of the light emitting elements;
a first lenticular lens sheet having a first lenticular lens sheet lower surface and a first lenticular lens sheet upper surface opposite to the first lenticular lens sheet lower surface in the Z axis, the first lenticular lens sheet being provided on the base such that the first lenticular lens sheet lower surface is opposite to the base surface, the first lenticular lens sheet having first grooves extending in the X axis on a side of the first lenticular lens sheet upper surface; and
a second lenticular lens sheet having a second lenticular lens sheet lower surface and a second lenticular lens sheet upper surface opposite to the second lenticular lens sheet lower surface in the Z axis, the second lenticular lens sheet being provided on the first lenticular lens sheet such that the second lenticular lens sheet lower surface is opposite to the first lenticular lens sheet upper surface, the second lenticular lens sheet having second grooves extending in the Y axis on a side of the second lenticular lens sheet upper surface.

2. The surface light source device according to claim 1, further comprising:
a fluorescent material sheet disposed on the second lenticular lens sheet.

3. The surface light source device according to claim 2, wherein the fluorescent material sheet comprises quantum dots.

4. The surface light source device according to claim 2, further comprising:
a prism sheet disposed on the fluorescent material sheet.

5. The surface light source device according to claim 1, wherein the light emitting elements are configured to emit a blue light or a white light.

6. The surface light source device according to claim 1, wherein the Y pitch is smaller than or equal to 5.0 times the X pitch.

7. The surface light source device according to claim 1, wherein the light emitting elements comprises
first light emitting elements disposed along an X axis first line parallel to the X axis with a first X pitch, and
second light emitting elements disposed along an X axis second line parallel to the X axis with a second X pitch,
Y axis first lines which are parallel to the Y axis and on each of which each of the first light emitting elements are provided being different from Y axis second lines which are parallel to the Y axis and on each of which each of the second light emitting elements are provided.

8. The surface light source device according to claim 7, wherein
the first X pitch is substantially equal to the second X pitch, and
wherein
the Y axis second lines have adjacent first Y axis second line and second Y axis second line, and
Y axis first lines have a Y axis first line which is provided in a middle between the adjacent first Y axis second line and second Y axis second line.

9. The surface light source device according to claim 7, wherein the light emitting elements comprises
third light emitting elements disposed along a Y axis first line parallel to the Y axis with a first Y pitch, and
fourth light emitting elements disposed along a Y axis second line parallel to the Y axis with a second Y pitch,
X axis first lines which are parallel to the X axis and on each of which each of the third light emitting elements are provided being different from X axis second lines which are parallel to the X axis and on each of which each of the fourth light emitting elements are provided.

10. The surface light source device according to claim 9, wherein
the first Y pitch is substantially equal to the second Y pitch, and
wherein
the X axis second lines have adjacent first X axis second line and second X axis second line, and X axis first lines have an X axis first line which is provided in a middle between the adjacent first Y axis second line and second Y axis second line.

11. The surface light source device according to claim 1, wherein a distance between the base surface and the first lenticular lens sheet lower surface is 0.1 to 0.6 of the X pitch.

12. The surface light source device according to claim 1, wherein the first grooves have adjacent first grooves, a distance between the adjacent first grooves being 150 μm to 550 μm.

13. The surface light source device according to claim 1, wherein
the first lenticular lens sheet has a thickness of 0.25 mm to 8.0 mm, and
wherein
the second lenticular lens sheet has a thickness of 0.25 mm to 8.0 mm.

14. The surface light source device according to claim 1, wherein at least one of the first lenticular lens sheet and the second lenticular lens sheet contains 2 wt % to 25 wt % of light diffusion material.

15. A transmission display device comprising:
a display panel; and
a backlight for the display panel comprising the surface light source device according to claim 1.

16. The surface light source device according to claim 1, wherein a distance between an upper end of the first lenticular lens sheet and the second lenticular lens sheet lower surface is equal to or less than 5 mm.

17. A surface light source device comprising:
a base having a base surface which is defined by an X axis and a Y axis perpendicular to the X axis and which is perpendicular to a Z axis;
light emitting elements disposed on the base surface along the X-axis with an X pitch and along the Y axis with a Y pitch to form a matrix, the X pitch being smaller than the Y pitch;
lenses having a batwing illumination distribution, each of the lenses covering each of the light emitting elements;
a first lenticular lens sheet having a first lenticular lens sheet lower surface and a first lenticular lens sheet upper surface opposite to the first lenticular lens sheet lower surface in the Z axis, the first lenticular lens sheet being provided on the base such that the first lenticular lens sheet lower surface is opposite to the base surface, the first lenticular lens sheet having first grooves extending in the X axis on a side of the first lenticular lens sheet upper surface;
a second lenticular lens sheet having a second lenticular lens sheet lower surface and a second lenticular lens sheet upper surface opposite to the second lenticular lens sheet lower surface in the Z axis, the second lenticular lens sheet being provided on the first lenticular lens sheet such that the second lenticular lens sheet lower surface is opposite to the first lenticular lens sheet upper surface, the second lenticular lens sheet having second grooves extending in the Y axis on a side of the second lenticular lens sheet upper surface; and
a fluorescent material sheet disposed on the second lenticular lens sheet, a distance between an upper end of the second lenticular lens sheet and a lower surface of the fluorescent material sheet being equal to or less than 5 mm.

18. A surface light source device comprising:
a base having a base surface which is defined by an X axis and a Y axis perpendicular to the X axis and which is perpendicular to a Z axis;
light emitting elements disposed on the base surface along the X-axis with an X pitch and along the Y axis with a Y pitch to form a matrix, the X pitch being smaller than the Y pitch;
lenses having a batwing illumination distribution, each of the lenses covering each of the light emitting elements;
a first lenticular lens sheet having a first lenticular lens sheet lower surface and a first lenticular lens sheet upper surface opposite to the first lenticular lens sheet lower surface in the Z axis, the first lenticular lens sheet being provided on the base such that the first lenticular lens sheet lower surface is opposite to the base surface, the first lenticular lens sheet having first grooves extending in the X axis on a side of the first lenticular lens sheet upper surface;
a second lenticular lens sheet having a second lenticular lens sheet lower surface and a second lenticular lens sheet upper surface opposite to the second lenticular lens sheet lower surface in the Z axis, the second lenticular lens sheet being provided on the first lenticular lens sheet such that the second lenticular lens sheet lower surface is opposite to the first lenticular lens sheet upper surface, the second lenticular lens sheet having second grooves extending in the Y axis on a side of the second lenticular lens sheet upper surface;

a fluorescent material sheet disposed on the second lenticular lens sheet; and a prism sheet disposed on the fluorescent material sheet, a distance between an upper surface of the fluorescent material sheet and a lower surface of the prism sheet being equal to or less than 5 mm.

* * * * *